United States Patent [19]

Hinn

[11] 4,357,623

[45] Nov. 2, 1982

[54] SECAM IDENTIFICATION SYSTEM

[75] Inventor: Werner Hinn, Zollikerberg, Switzerland

[73] Assignee: RCA Corporation, New York, N.Y.

[21] Appl. No.: 257,167

[22] Filed: Apr. 24, 1981

[51] Int. Cl.³ .............................................. H04N 9/47
[52] U.S. Cl. ....................................................... 358/18
[58] Field of Search ..................................... 358/18, 14

[56] References Cited

U.S. PATENT DOCUMENTS

| | | | |
|---|---|---|---|
| 3,336,437 | 8/1967 | Brouard et al. | 178/5.4 |
| 3,553,357 | 1/1971 | Carnt | 358/18 |
| 3,877,066 | 4/1975 | van Gils | 358/18 |
| 4,240,102 | 12/1980 | Groeneweg | 358/11 |

Primary Examiner—Richard Murray
Attorney, Agent, or Firm—Eugene M. Whitacre; Paul J. Rasmussen; William H. Meagher

[57] ABSTRACT

Color TV receiver subject to reception of SECAM signals incorporates dual-mode identification system for identifying and correcting an incorrect mode of line-by-line switching in SECAM demodulation apparatus. In one (horizontal) mode of operation, identification information is derived from lead-in bursts preceding image signals during active line intervals; in other (vertical) mode of operation, identification information is derived from identification oscillations present during selected line periods within vertical blanking interval. Single FM detector and pair of sample-and-hold circuits responsive to detector output are used in both modes of operation, with mode selection sensitive control signal generators developing detector center frequency tuning control, detector gain control, and sampling control waves of forms dependent on mode selected. Mode selection signal, to which control signal generators respond, comprises vertical blanking waveform with DC component of one magnitude when vertical identification mode is desired, and DC component of a different magnitude when horizontal identification mode is desired.

12 Claims, 7 Drawing Figures

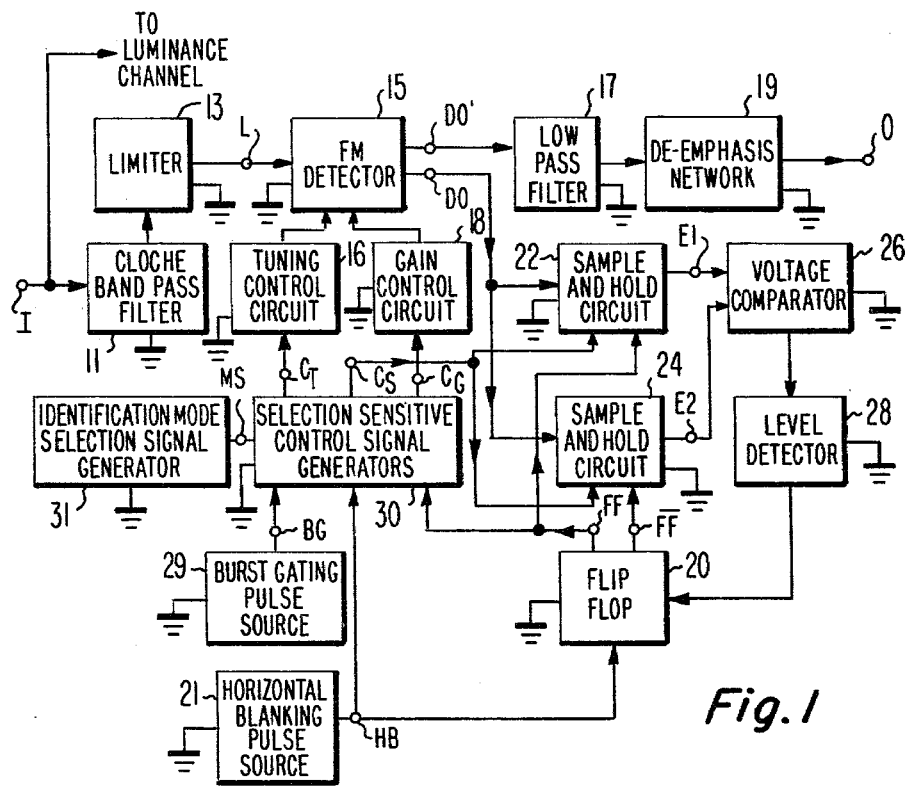
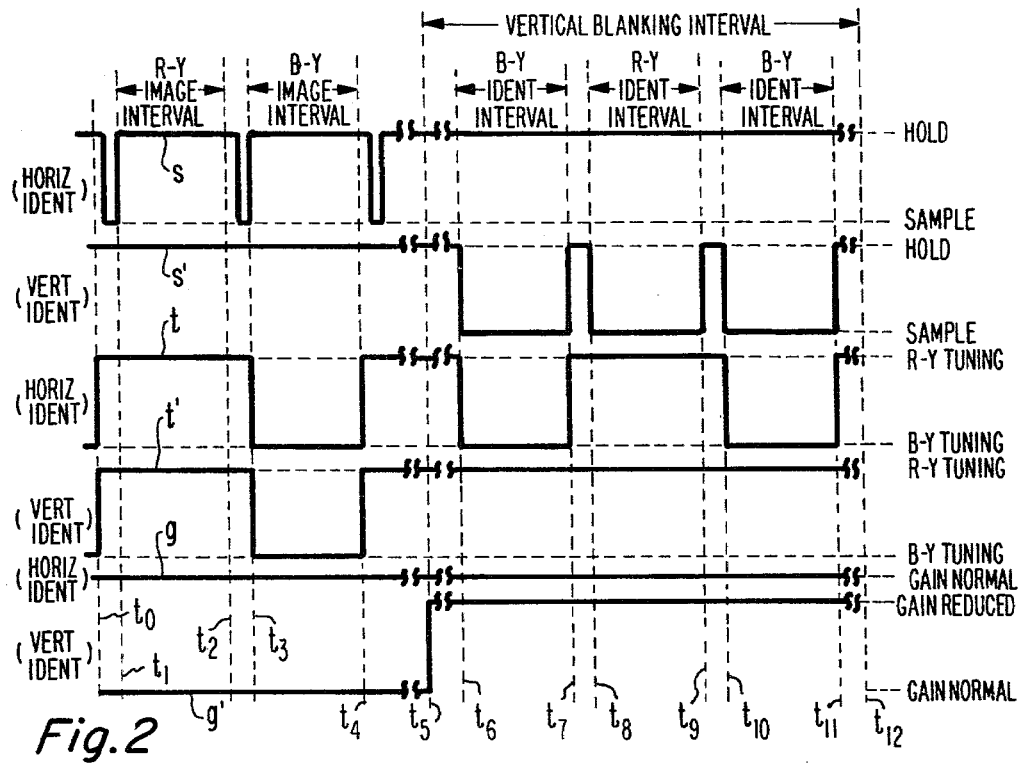

SECAM IDENTIFICATION SYSTEM

The present invention relates generally to an identification system for a color television receiver which may serve in identifying and correcting an incorrect mode of line-by-line switching employed in a SECAM demodulator, and particularly to identification systems of such purpose which are subject to operation in a mode in which identification information is derived from identification oscillations appearing during successive line intervals within each vertical blanking period, or are subject to alternative operation in either of two modes, one being a mode of the above-described identification oscillation responsive type, and the other being a mode in which identification information is derived from the lead-in bursts preceding the image signals during active line intervals.

In the SECAM color television system, R-Y and B-Y color-difference signals frequency modulate respective subcarriers (with respective resting frequencies of 4.40625 MHz. and 4.250 MHz.) which are provided alternately on a line-by-line basis in the active line intervals of the transmitted SECAM signal. An economical approach to processing such signals in a SECAM receiver, which is also attractive for use in dual-standard (SECAM/PAL) receivers, is to convert the SECAM signal into a signal similar to a PAL signal (i.e., a "quasi-PAL" signal) for further processing by standard PAL signal decoding techniques. The system for effecting such conversion is desirably of the general type described in U.K. Pat. No. 1,358,551, wherein the respective SECAM subcarriers are demodulated sequentially by a single FM detector, and the resultant color-difference signals amplitude modulate in appropriate sequence respective phases of a subcarrier derived from the PAL crystal oscillator of the PAL decoder apparatus. U.S. Pat. No. 4,232,268, for example, discloses an arrangement for line-by-line switching of the center frequency tuning of an FM detector which readily permits the aforementioned sequential demodulation of the respective SECAM subcarriers by a single FM detector.

In such use of a single FM detector for sequential demodulation of the respective SECAM subcarriers, an identification system is required for identification and correction of an incorrect mode of line-by-line switching of the detector's center frequency tuning. One source of information for such identification purposes is found in the lead-in bursts of oscillations which precede the image portion of each active line interval (with a lead-in burst at the R-Y resting frequency preceding the image portion of an active line interval that conveys R-Y image information, and with a lead-in burst at the B-Y resting frequency preceding the image portion of an active line interval that conveys B-Y image information).

In the identification system disclosed in U.S. Pat. No. 4,240,102—Groeneweg, a flip-flop develops half line rate control waves for use in switching the center frequency tuning of the detector employed for demodulating received SECAM signals. When the phasing of the flip-flop output is correct, the detector is provided with center frequency tuning (4.40625 MHz.) appropriate to demodulation of the R-Y modulated subcarrier during the image portion of an R-Y line interval of the SECAM signal, and tuning (4.250 MHz.) appropriate for demodulation of the B-Y modulated subcarrier during the image portion of a B-Y line interval of the SECAM signal. Through the supplemental association of line rate pulses in the tuning control, however, the timing of the changes in detector center frequency tuning is so controlled that during the lead-in bursts preceding the image portions of both of such R-Y and B-Y line intervals, the detector center frequency tuning is the same (e.g., tuned for a center frequency corresponding to the R-Y subcarrier resting frequency). As a consequence of holding the same (R-Y subcarrier resting frequency) center frequency tuning for all burst intervals, there appears, in the filtered output of the detector, pulses during alternate line interval blanking portions which identify the successive occurrences of a particular (B-Y) line interval.

In the identification system of the aforesaid Groeneweg patent, the filtered output of a detector subject to center frequency tuning control of the above-described type is applied to a pair of sample-and-hold circuits. Using respective half line rate control waves of mutually opposite phase derived from the flip-flop, and common, line rate, burst interval gating pulses, for control of the sampling times of the respective sample-and-hold circuits, one sample-and-hold circuit effects sampling of the filtered detector output during the lead-in burst occurrence of alternate line intervals, while the other sample-and-hold circuit effects a sampling of the filtered detector output during the lead-in burst occurrence of the intervening line intervals. Comparison of the outputs of the two sample-and-hold circuits in a voltage comparator yields an output indicative of the correctness or incorrectness of the phasing of the flip-flop circuit. When the output is indicative of incorrect flip-flop phasing, the flip-flop is shut down, and then allowed to restart, whereupon a new comparison is effected, with such a process repeated until correct flip-flop phasing is achieved.

In accordance with the SECAM signal standards employed, for example, in France, the SECAM signal includes identification signals presented during each vertical blanking interval, in particular during nine successive line intervals following the completion of the post-sync equalizing pulses. During alternate ones of these identification line intervals, a B-Y line identification is conveyed by an initial appearance (following line sync pulse termination) of subcarrier oscillations at the B-Y resting frequency (4.250 MHz.) followed by a linear decline of subcarrier frequency to the frequency (3.9 MHz.) of the lower limit of the subcarrier frequency deviation range (3.9 MHz.-4.756250 MHz.), with the remainder of the line interval occupied by subcarrier oscillations held substantially constant in frequency at the lower range limit frequency. During intervening ones of these identification line intervals, an R-Y line identification is conveyed by initial appearance of subcarrier oscillations at the R-Y resting frequency (4.406250 MHz.), followed by a linear rise of subcarrier frequency to the frequency (4.756250 MHz.) of the upper limit of the subcarrier frequency deviation range, with the remainder of the line interval occupied by subcarrier oscillations held substantially constant in frequency at the upper range limit frequency.

In accordance with a first aspect of the present invention, a SECAM identification system is provided with the capability of effecting the functions of identifying and correcting an incorrect mode of line-by-line switching of detector center frequency tuning in response to the above-described identification signals presented during each vertical blanking interval (with such a mode of response referred to hereinafter as "vertical identification", in contrast with a mode of response relying upon lead-in bursts, as in the previously described U.S. Pat. No. 4,240,102, to be hereinafter characterized as "horizontal identification").

In a vertical identification system embodying principles of the present invention, with control of switching of the center frequency tuning of the FM detector responsive to field rate pulses in addition to half line rate control waves from the flip-flop circuit, the detector center frequency tuning remains the same (e.g., at the R-Y subcarrier resting frequency) during the successive line intervals occupied by the above-described identification signals. As a consequence of such (R-Y) tuning constancy, a filtered output of the detector contains pulses of a particular polarity indicative of the occurrence of the B-Y identification line intervals, with pulses of the opposite polarity (and lesser amplitude) developed during the R-Y identification line intervals. The detector output is supplied to a pair of sample-and-hold circuits, with one sampling the detector output during alternate ones of the periods of appearance of the identification oscillations, and the other sampling the detector output during intervening ones of the periods of appearance of the identification oscillations. Comparison of the outputs of the two sample-and-hold circuits yields an output indicative of the correctness or incorrectness of the phasing of the flip-flop circuit. Illustratively, when a significant difference between the output levels of the two sample-and-hold circuits of a given sense exists, the flip-flop is shut down, and then allowed to restart, whereupon a new comparison is effected, with such a process repeated until correct flip-flop phasing is achieved.

In an illustrative realization of such a vertical identification system, control of the sampling operations is rendered responsive to vertical and horizontal blanking signals, such that each of the sample-and-hold circuits is maintained in a hold condition during active line intervals, and during horizontal blanking intervals that intervene between identification oscillation appearances.

In accordance with a further aspect of the present invention, it is recognized as advantageous to provide an identification system which is capable of alternative operation in (1) a vertical identification mode and (2) a horizontal identification mode. In an illustrative form of such a dual-mode identification system, the identification system operates in the manner of the above-described vertical identification system when a vertical identification mode is selected, and operates in the general manner of the horizontal identification system of the aforementioned Groeneweg patent when a horizontal identification mode is selected. In a receiver incorporating the dual-mode identification system, there is included an identification mode selected signal generator providing an output indicating the identification mode selected, and selection sensitive control signal generators responsive to said output for establishing control of detector center frequency tuning changes and of sampling operations in a manner appropriate to the mode selected. With the same sample-and-hold circuits and output comparator used in both modes, desirably the control signal generators additionally effect a mode-sensitive control of detector gain for purposes of equalization of comparator input conditions for the respective modes.

Where circuitry of the identification system and associated FM detector is at least partially realized in integrated circuit form on a common substrate, it is advantageous to implement the selection sensitive control signal generating functions with circuits realized in integrated circuit form on the same substrate, while relegating implementation of the identification mode selection signal generator to off-chip circuitry. With such an arrangement, a receiver manufacturer using the integrated circuit is provided with a variety of receiver design options: e.g., (a) implementation of the mode selection signal generator in a manner establishing operation of the identification system in the horizontal identification mode only; (b) implementation of the mode selection signal generator in a manner establishing operation of the identification system in the vertical identification mode only; and (c) implementation of the mode selection signal generator in a manner permitting the receiver user to select the identification mode.

In an illustrative utilization of a dual-mode identification system embodying principles of the present invention, the mode selection signal is advantageously in the form of a vertical blanking waveform having associated therewith a level of DC component establishing one of the following relationships between the voltage excursions of the mode selection signal and a given voltage reference level: (a) a first relationship such that all voltage excursions of the signal waveform remain above the reference level; (b) a second relationship such that all voltage excursions of the signal waveform remain below the reference level. For response to such a mode selection signal, the selection sensitive control signal generating apparatus desirably includes means for comparing the selection signal input with the voltage reference level and deriving control currents indicative of the excursion/reference relationship found to be present. Use of the above-described form of mode selection signal advantageously conserves chip terminals for the integrated circuit involved, since the same chip terminal which conveys mode selection information to the integrated circuit also conveys thereto vertical blanking information, which may be used for a variety of purposes therein (inclusive of identification system control purposes). Illustratively, when a horizontal identification mode is established for the dual-mode identification system, each of the sample-and-hold circuits is rendered responsive to the vertical blanking waveform in such manner that it is maintained in a hold condition throughout each vertical blanking interval.

In the accompanying drawings:

FIG. 1 illustrates, by block diagram representation, color television receiver apparatus incorporating a dual-mode SECAM identification system pursuant to principles of the present invention;

FIGS. 2 and 3a illustrate graphically waveforms of aid in explaining the operation of the apparatus of FIG. 1;

Figure 3A:
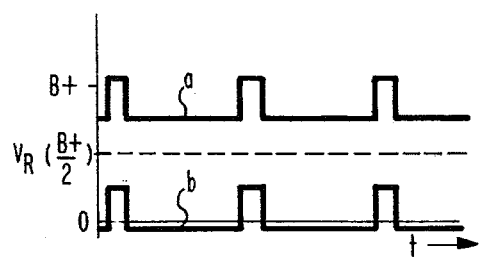
Figure 3B:
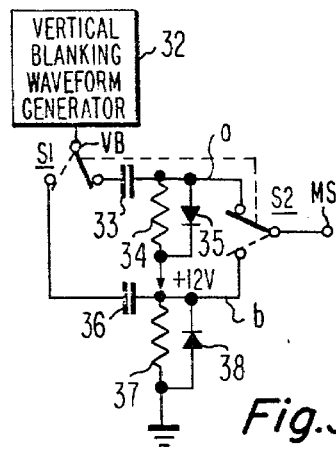
Figure 4:
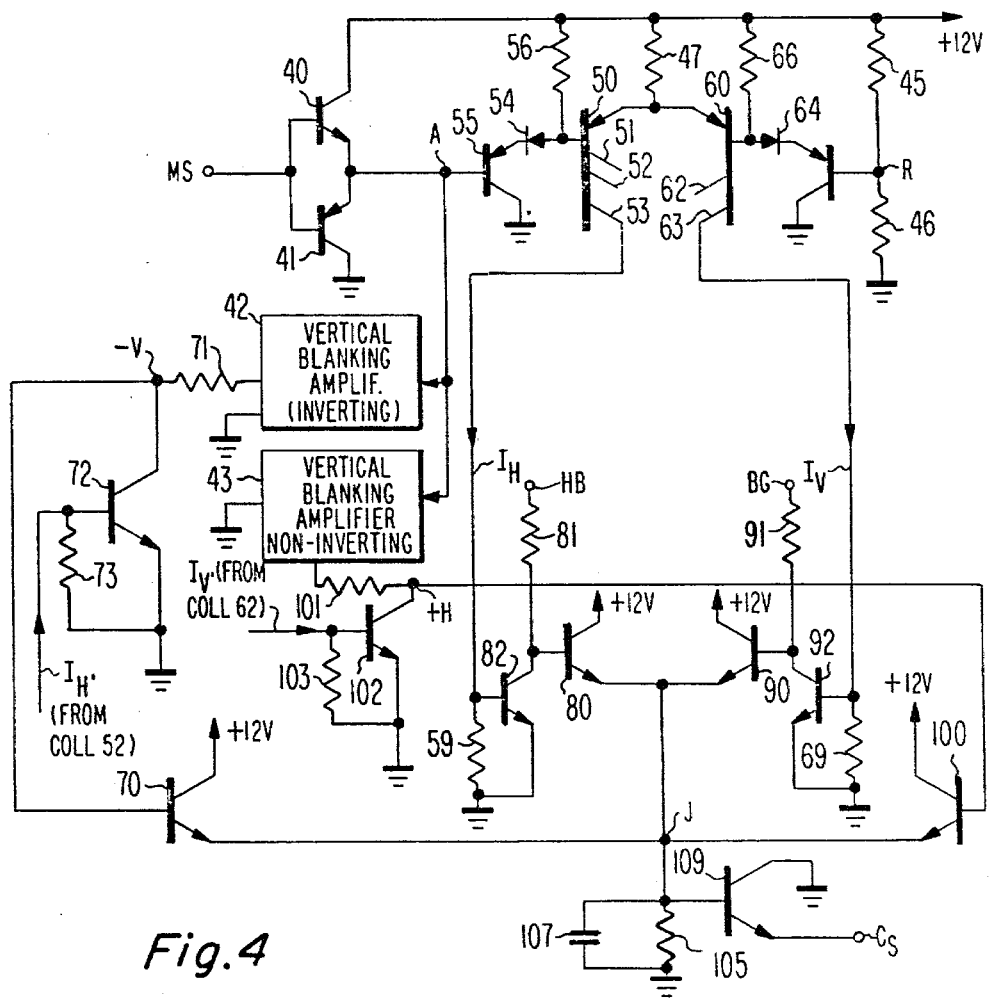
Figure 5:
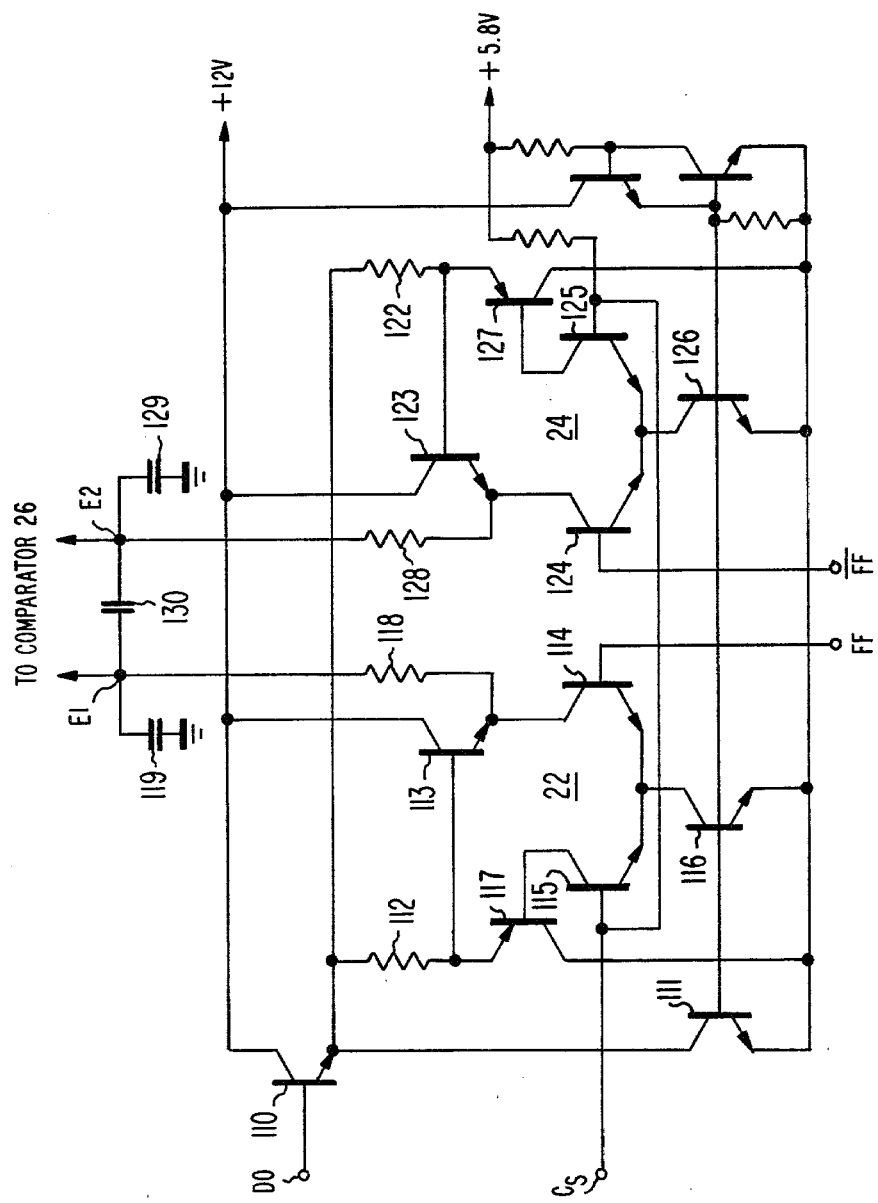
Figure 6:
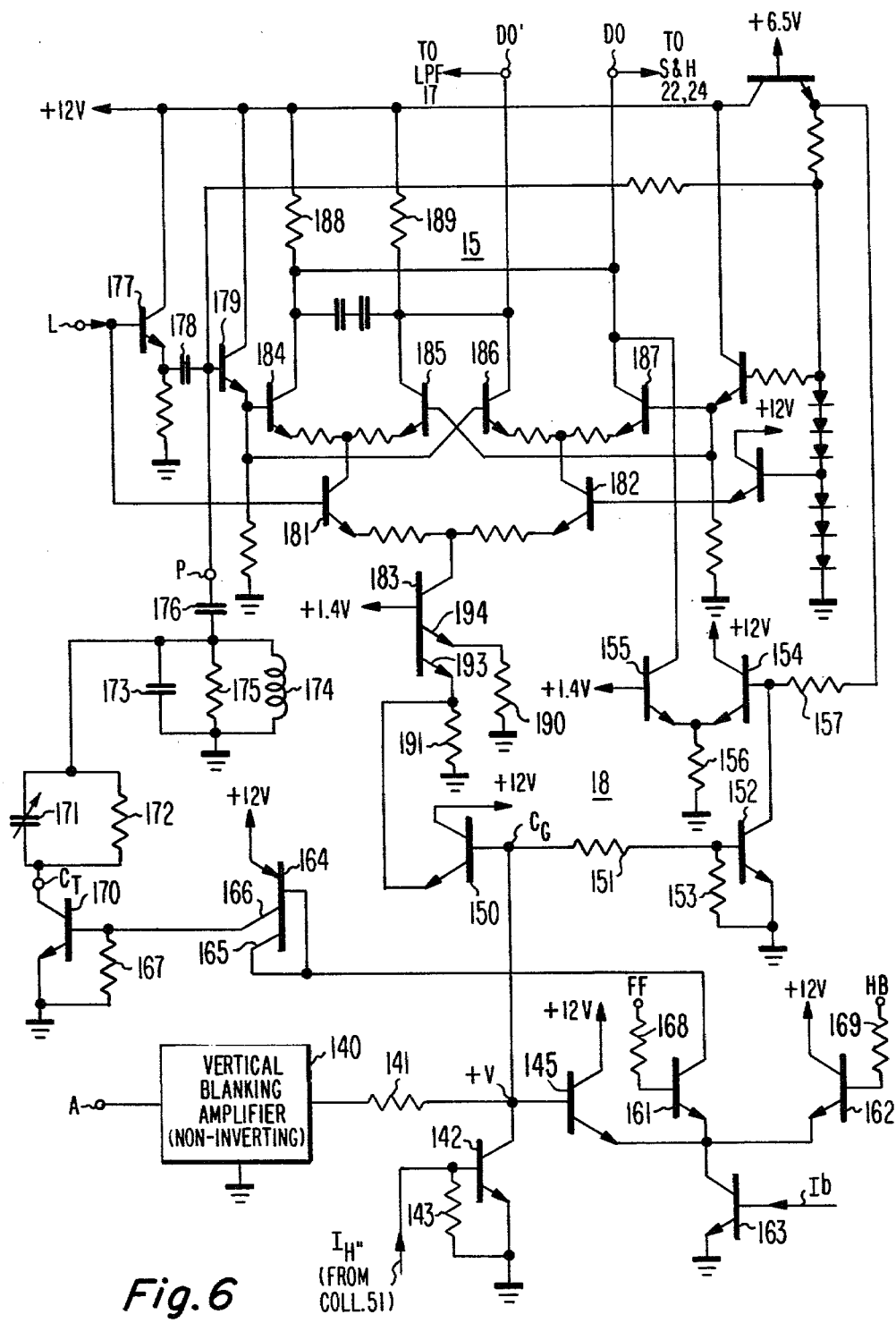

FIG. 3b illustrates, partially schematically and partially by block diagram representation, a circuit arrangement which may be advantageously employed for implementing the function of identification mode selection signal generation in the apparatus of FIG. 1, and FIG. 3a illustrates graphically waveforms associated with such a circuit arrangement; and FIGS. 4, 5, and 6 illustrate, partially schematically and partially by block diagram representation, circuit arrangements which may be advantageously employed for implementing other of the circuit functions in the apparatus of FIG. 1.

In the receiver apparatus of FIG. 1, a composite video input signal (derived from the receiver's video detector, not illustrated) appears at input terminal I, and is supplied to a bandpass filter 11, as well as to the receiver's luminance channel (not illustrated). Bandpass filter 11 has a passband which encompasses the chrominance signal band of a SECAM transmission, and is provided with a frequency response characteristic of a "cloche" or bell-shaped form, appropriately complementary to the characteristic employed for pre-emphasis of subcarrier sidebands in SECAM signal formation.

The output of bandpass filter 11 is supplied to a limiter 13 which delivers a limited version thereof to its output terminal L. The limited signals appearing at terminal L are supplied to an FM detector 15, illustratively of the quadrature detector type, such as described, for example, in the aforementioned U.S. Pat. No. 4,232,268. An output terminal (DO') of the FM detector 15 is coupled to the input of a lowpass filter 17 having a passband appropriate for modulating signal recovery and subcarrier rejection.

A tuning control circuit 16 is associated with the FM detector 15 so as to alter the effective center frequency of its frequency discrimination characteristic in a controlled manner to be described in detail subsequently. The tuning control, when operating correctly during reception of SECAM signals, is such that the output of lowpass filter 17 comprises, during the image portions of successive active line intervals, recovered R-Y and B-Y color-difference signals in sequence. The color-difference signals passed by filter 17 are delivered to an output terminal O via a de-emphasis network 19, provided with a characteristic complementary to the modulating signal pre-emphasis characteristic employed in SECAM signal formation. Also associated with the FM detector 15 is a gain control circuit 18, providing selective control of the detector gain in a manner to be described in detail subsequently.

An output of FM detector 15, appearing at terminal DO, is supplied to the signal inputs of a pair of sample-and-hold circuits 22 and 24. Operation of sample-and-hold circuit 22 is subject to control by (a) a half line rate wave output of a flip-flop 20, appearing at terminal $\overline{FF}$, and (b) a sampling control wave developed at terminal $C_S$ by selection sensitive control signal generators 30 (functioning in a manner to be described subsequently). Operation of sample-and-hold circuit 24 is subject to control by (a) a half line rate wave output of flip-flop 20, appearing at terminal FF (and complementary in phase to the output at terminal $\overline{FF}$), and (b) the sampling control wave at terminal $C_S$. Flip-flop 20 is subject to triggering by line rate pulses (illustratively timed to encompass the horizontal blanking intervals of the SECAM signal and developed by a horizontal blanking pulse source 21 at its output terminal HB).

The outputs of the respective sample-and-hold circuits 22 and 24, appearing at respective output terminals E1 and E2, are supplied to a voltage comparator 26. A level detector 28, responsive to an output of comparator 26, effects disabling or enabling of the flip-flop 20.

In addition to the development of the aforementioned sampling control waves at terminal $C_S$, the selection sensitive control signal generators 30 develop a tuning control wave at terminal $C_T$ for application to tuning control circuit 16, and a gain control wave at terminal $C_G$ for application to gain control circuit 18. Inputs to the generators 30 include: (1) half line rate waves from terminal FF of the triggered flip-flop 20; (2) horizontal blanking pulses from terminal HB of horizontal blanking pulse source 21; (3) burst gating pulses (timed to encompass a "back porch" portion of the horizontal blanking intervals of the SECAM signal) from the output terminal BG of a burst gating pulse source 29; and an output of an identification mode selection signal generator 31 appearing at terminal MS.

The control signal generating apparatus 30 responds to the appearance of a signal at terminal MS indicating selection of a horizontal identification mode by generating horizontal mode control waves s, t and g (as illustrated in FIG. 2) at the respective control terminals $C_S$, $C_T$ and $C_G$. The control signal generating apparatus 30 responds to the appearance of a signal at terminal MS indicating selection of a vertical identification mode by generating vertical mode control waves s', t' and g' (also illustrated in FIG. 2) at said control terminals $C_S$, $C_T$ and $C_G$.

As shown by waveform "t" in FIG. 2, the horizontal mode tuning control wave at terminal $C_T$ alternatively dwells at a level (labeled "R-Y TUNING") establishing center frequency tuning of FM detector 15 at the R-Y subcarrier resting frequency (4.40625 MHz.), and at a level (labeled "B-Y TUNING") establishing center frequency tuning of FM detector 15 at the B-Y subcarrier resting frequency (4.250 MHz.).

With the development of the horizontal mode tuning control wave "t" suitably responsive to the horizontal blanking pulse input to generating apparatus 30, the detector's center frequency tuning corresponds to the R-Y resting frequency during all lead-in burst appearances, i.e., during each lead-in burst preceding B-Y image information delivery, as well as during each lead-in burst preceding R-Y image information delivery. With the development of wave "t" additionally responsive to the half line rate waves supplied to generating apparatus 30 from flip-flop 20, however, the detector's center frequency tuning is different during the respective image portions of successive active line intervals. When the phasing of the flip-flop operation is correct, center frequency tuning at the R-Y resting frequency coincides with an R-Y image interval, and center frequency tuning at the B-Y resting frequency coincides with a B-Y image interval, permitting proper color-difference signal recovery by detector 15. For the FIG. 2 illustration of the waveform "t", such a condition for the flip-flop phasing is present. When the phasing of the flip-flop operation is incorrect, center frequency tuning at the R-Y resting frequency is present during each B-Y image interval and center frequency tuning at the B-Y resting frequency is present during each R-Y image interval, precluding proper color-difference signal recovery by FM detector 15.

As suggested by waveform "s" in FIG. 2, the horizontal mode sampling control wave at terminal $C_S$ alternatively dwells at a level (labeled "HOLD") ensuring maintenance of the respective sample-and-hold circuits 22, 24 in a hold state, and a level (labeled "SAMPLE") permitting switching of a sample-and-hold circuit to a sampling state when coincident with an appropriate level for the half line rate wave input thereto. As FIG. 2 indicates, waveform "s" is generated in such manner that both sample-and-hold circuits are maintained in a hold state during the image portion of each active line interval, and throughout each vertical blanking interval. The sampling control wave swings to a samplingpermission level only during the lead-in burst portions of active line intervals. With the half line rate wave inputs to the respective sample-and-hold circuits being complementary in phase, only one of the sample-and-hold circuits is enabled for sampling during any given lead-in burst occurrence, and the sampling enablement alternates between the respective sample-and-hold circuits during successive lead-in burst occurrences.

As suggested by waveform "g" in FIG. 2, the horizontal mode gain control wave at terminal $C_G$ remains at a fixed level (labeled "GAIN NORMAL") throughout active line intervals and throughout each vertical blanking interval. The maintained level provides the detector 15 with a gain appropriate to development of color-difference signals of a desired level at output terminal O.

As shown by waveform t' in FIG. 2, the vertical mode tuning control wave at terminal $C_T$ dwells at the aforementioned R-Y TUNING level throughout each vertical blanking interval, whereas it alternates between the R-Y TUNING level and the aforementioned B-Y TUNING level for the respective image portions of successive active line intervals. With the center frequency tuning of FM detector 15 thus held at the R-Y resting frequency throughout the nine successive identification line intervals, the detector output at terminal DO (when the received SECAM signals contain the vertical identification oscillations) will comprise pulses of a first polarity and a first magnitude during the B-Y identification intervals (when identification oscillation frequency drops to the lower deviation range limit frequency, 506.250 KHz. below the R-Y resting frequency), and will comprise pulses of the opposite polarity and a lesser magnitude during the R-Y identification intervals (when identification oscillation frequency rises to the upper deviation range limit frequency, 350 KHz. above the R-Y resting frequency).

As suggested by waveform s' in FIG. 2, the vertical mode sampling control wave at terminal $C_T$ dwells at the aforementioned HOLD level throughout the active line intervals and during the horizontal blanking intervals which intervene between vertical identification oscillation appearances, and dwells at the aforementioned SAMPLE level during successive vertical identification oscillation appearances. With the half line rate wave inputs to the respective sample-and-hold circuits 22, 24 being complementary in phase as previously discussed, the effect of waveform s' (during operations in a vertical identification mode) is such that only one sample-and-hold circuit is switched to a sampling state during any given identification oscillation appearance, and sampling enablement alternates between the respective sample-and-hold circuits during successive ones of the identification oscillation appearances.

As indicated by waveform g' in FIG. 2, the vertical mode gain control wave at terminal $C_G$ alternatively dwells at the aforementioned GAIN NORMAL level, and at a level (labeled "GAIN REDUCED") which effects (through operation of gain control circuit 18) a reduction of the detector gain below the gain value maintained during operations in the horizontal identification mode. The effect of gain control wave g' (during operations in the vertical identification mode) is (1) maintenance of the detector gain, throughout active line intervals, at the same gain value as is maintained during operations in the horizontal identification mode, and (2) maintenance of the detector gain, throughout each vertical blanking interval, at a reduced gain value. The purpose of the gain reduction is to aid in substantial equalization of comparator input difference conditions for operations in the two modes. It should be appreciated that, without the gain reduction provision, the difference between the peak output voltages developed in the vertical identification mode by detector 15 during successive identification line intervals (when signal frequency shifts between deviation range limits separated by more than 850 KHz.) would greatly exceed the difference between the peak output voltages developed in the horizontal identification mode by detector 15 during successive lead-in burst appearances (when signal frequency shifts between respective resting frequencies separated by approximately 156 KHz.).

As previously noted, when integrated circuit realization of the control signal generators 30 and other identification system elements is contemplated, it is advantageous to implement the function of the identification mode selection signal generator 31 with off-chip components and to configure generator 31 in such manner that it serves as a source of vertical blanking information as well as identification mode selection information. When this is done, terminal MS may conveniently serve as a chip input terminal, receiving two inputs for the integrated circuit in the form of a common signal.

FIG. 3a is of aid in explaining one way in which the aforesaid two types of information may be conveyed to terminal MS by a common signal. In FIG. 3a, waveform "a" comprises a vertical blanking waveform formed by (1) a train of positive-going pulses of a given magnitude timed to substantially coincide with the successive vertical blanking intervals of an incoming signal, and (2) a DC component of a magnitude selected relative to the pulse swing magnitude and to the magnitude of a selected reference potential $V_R$ (illustratively chosen to be one half of the magnitude of an available B+ operating potential) so that all excursions of the waveform lie significantly above (i.e., here, are significantly more positive than) the reference potential $V_R$. In contrast, waveform "b" of FIG. 2 comprises a vertical blanking waveform formed by (1) a train of pulses of similar timing, magnitude and direction to those in waveform "a", and (2) a (lesser) DC component of a magnitude selected relative to the pulse swing and $V_R$ magnitudes so that all excursions of the waveform lie significantly below (i.e., here, are significantly less positive than) the reference potential $V_R$. If the control signal generating apparatus 30 of FIG. 1 is provided with circuitry suitably sensitive to the relationship between the voltage variations at terminal MS and the reference potential $V_R$, the identification mode selection signal generator 31 can supply waveform "a" to terminal MS to indicate selection of a particular one (e.g., vertical) of the two identification modes, and, alternatively, waveform "b" to terminal MS to indicate selection of the other (e.g., horizontal) of the two identification modes. In each instance, conveyance of vertical blanking information accompanies conveyance of the indication of the selected identification mode to terminal MS.

FIG. 3b shows an illustrative circuit arrangement which may be employed for alternative development of the waveforms "a" and "b" of FIG. 3a. In the arrangement of FIG. 3b, a vertical blanking waveform generator 32 develops a train of positive-going vertical blanking pulses at the generator output terminal VB. A first single-pole, double-throw switch S1, when in the switching state illustrated in FIG. 3b by a solid line showing, couples terminal VB to the positive terminal (e.g., +12 V.) of a unidirectional operating potential supply via the series combination of a capacitor 33 and a resistor 34 (shunted by a diode 35), arranged in the order named, with the cathode of diode 35 connected to the +12 V. terminal. A second single-pole, double-throw switch S2 (ganged with switch S1), in the switching state illustrated in FIG. 3b by a solid line showing, links terminal MS to the junction of capacitor 33 and resistor 34. With the magnitude of the pulses developed by generator 32 chosen to be sufficiently smaller than an illustrative $V_R$ value of +6 volts (half the potential at the +12 V. terminal), clamping action by diode 35 during pulse appearances results in development of voltage variations at terminal MS in the form of waveform "a" of FIG. 3a.

When the ganged switches S1 and S2 are in the switching state illustrated by the dotted-line showing of FIG. 3b, generator output terminal VB is coupled to the negative terminal (e.g., ground) of the operating potential supply via the series combination of a capacitor 36 and a resistor 37 (shunted by a diode 38), arranged in the order named, with the anode of diode 38 connected to the ground terminal; and terminal MS is linked to the junction of capacitor 36 and resistor 37. Clamping action by diode 38 during inter-pulse intervals results in development of voltage variations at terminal MS in the form of waveform "b" of FIG. 3a.

Where it is desired that the receiver user may select the identification mode to be used, the identification mode selection signal generator 31 of FIG. 1 may illustratively take the form of the arrangement as shown in FIG. 3b. However, where the receiver is to be dedicated to the use of only one of the two identification modes, the inappropriate capacitor-resistor-diode combination of the FIG. 3b arrangement may be deleted, with switch S1 replaced by a direct connection between terminal VB and the retained capacitor, and switch S2 replaced by a direct connection between terminal MS and the junction of the retained capacitor and resistor.

FIG. 4 illustrates circuitry which may be advantageously employed in implementation of that portion of the selection sensitive control signal generating apparatus 30 which develops the sampling control waves (s, or s'; FIG. 2) at terminal $C_S$ in the FIG. 1 system, and which provides suitable cooperation with a mode selection signal generator of the type discussed above in connection with FIGS. 3a and 3b.

In FIG. 4, terminal MS is directly connected to the base electrodes of an NPN transistor 40 and a PNP transistor 41. The collector electrode of transistor 40 is connected to the positive terminal (+12 V.) of a unidirectional operating potential supply, and the collector electrode of transistor 41 is connected to the negative terminal (ground) of the supply. The emitter electrodes of transistors 40 and 41 are jointly connected to a terminal A.

A pair of multiple-collector PNP transistors 50 and 60 are disposed with their emitter electrodes interconnected and returned to the +12 V. terminal via a current source resistor 47. The base electrode of transistor 60 is connected via diode 64 and the emitter-base path of a grounded-collector PNP transistor 65 to the output terminal R of a voltage divider formed by resistors 45 and 46, coupled in series between the +12 V. and grounded supply terminals. The base electrode of transistor 50 is connected via diode 54 and the emitter-base path of a grounded-collector PNP transistor 55 to terminal A. Respective resistors 56 and 66 link the respective base electrodes of transistors 50 and 60 to the +12 V. terminal.

The collector current ($I_H$) from collector 53 is supplied to the base electrode of a grounded-emitter NPN transistor 82, which has a resistor 59 in shunt with its base-emitter path. The collector current ($I_V$) from collector 63 is supplied to the base electrode of a grounded-emitter NPN transistor 92, which has a resistor 69 in shunt with its base-emitter path.

A pair of NPN transistors 80, 90 are disposed with their collector electrodes directly connected to the +12 V. terminal, and with their emitter electrodes interconnected (at terminal J) and returned to ground via a resistor 105 (shunted by a capacitor 107). The base electrode of transistor 80 is directly connected to the collector electrode of transistor 82, and is connected via resistor 81 to terminal HB of the horizontal blanking pulse source 21 (FIG. 1). The base electrode of transistor 90 is directly connected to the collector electrode of transistor 92, and is connected via resistor 91 to terminal BG of the burst gating pulse source 29 (FIG. 1). The base-emitter path of a grounded-collector NPN transistor 109 links terminal J to the sampling control wave output terminal $C_S$.

Terminal A is additionally connected to the inputs of a phase inverting vertical blanking amplifier 42 and a non-inverting vertical blanking amplifier 43. The output of inverting amplifier 42 is connected to terminal −V by a resistor 71, and the output of non-inverting amplifier 43 is connected to terminal +H by a resistor 101. The collector current ($I_H'$) from collector electrode 52 of transistor 50 is supplied to the base electrode of a grounded-emitter NPN transistor 72. The base-emitter path of transistor 72 is shunted by a resistor 73, and the collector electrode of transistor 72 is directly connected to terminal −V. The collector current ($I_V'$) from collector electrode 62 of transistor 60 is supplied to the base electrode of a grounded-emitter NPN transistor 102. The base-emitter path of transistor 102 is shunted by a resistor 103, and the collector electrode of transistor 102 is directly connected to terminal +H.

Another pair of NPN transistors 70, 100 have their collector electrodes directly connected to the +12 V. terminal and their emitter electrodes directly connected to the aforementioned terminal J. The base electrode of transistor 70 is directly connected to terminal −V, and the base electrode of transistor 100 is directly connected to terminal +H.

In operation of the FIG. 4 arrangement, when waveform "a" is supplied to terminal MS, it is coupled by emitter-follower action of transistor 40 to terminal A. Amplifier 42 responds thereto by developing a phase-inverted version of the vertical blanking waveform (i.e., comprising a train of negative-going vertical blanking pulses) at its output, while amplifier 43 responds thereto by developing a non-inverted version of the vertical blanking waveform (i.e., comprising a train of positive-going vertical blanking pulses) at its output.

Transistors 50 and 60 function to compare the voltage at terminal A with the reference potential ($V_R$) at the voltage divider output terminal R. Illustratively, the resistors 45, 46 are proportioned to establish $V_R$ at half the potential of the +12 V. terminal. In the presence of waveform "a", transistor 50, diode 54, and transistor 55 are rendered non-conducting, and the current supplied via resistor 47 is switched to transistor 60. With the current from resistor 47 fully switched to transistor 60, $I_V$ is of a magnitude to render transistor 92 strongly conducting, with the consequence that the base of transistor 90 is clamped near ground potential (precluding conduction by transistor 90). The collector current ($I_V'$) from collector 62 of conducting transistor 60 renders transistor 102 also strongly conducting, with the consequence that terminal +H and the base of transistor 100 are also clamped near ground potential (precluding conduction by transistor 100).

With transistor 50 cut off, $I_H$ is zero, wherefore transistor 82 is cut off, permitting the potential at the base electrode of transistor 80 to follow the voltage variations at terminal HB. With transistor 50 cut off, the current $I_H'$ from collector 52 of transistor 50 is also zero, wherefore transistor 72 is cut off, permitting the potential at terminal −V and the base of transistor 70 to follow the voltage variations at the output of inverting amplifier 42.

During the inter-pulse intervals of the phase-inverted vertical blanking waveform developed by amplifier 42, the base of transistor 70 is driven in a positive direction, transistor 70 conducts, and terminal J is elevated to a positive potential. The sampling control wave at terminal $C_S$, following the potential at terminal J, is thus maintained at a positive ("HOLD") level throughout the active line intervals (as shown by waveform s' of FIG. 2). During each vertical blanking interval, the inverted vertical blanking pulse in the output of amplifier 42 cuts off transistor 70. The potential at terminal J is thus depressed (i.e., at ground potential) throughout the vertical blanking interval, except during those portions thereof when positive-going horizontal blanking pulses from terminal HB turn transistor 80 on and return terminal J to a positive level. During these pulse appearances, the sampling control wave at terminal $C_S$ follows the potential at terminal J and thus rises to the HOLD level, but during the remaining portions of the vertical blanking interval (including the identification oscillation appearances) the potential at terminal $C_S$ drops to the "SAMPLE" level (see waveform s', FIG. 2). The apparatus of FIG. 4 thus serves to provide a sampling control wave output appropriate to the vertical identification mode when waveform "a" is delivered to terminal MS.

When waveform "b" is delivered to terminal MS, it is coupled to terminal A via the emitter-follower action of transistor 41. Amplifiers 42 and 43 again perform the functions of developing a phase-inverted version of the vertical blanking waveform, and a non-inverted version thereof, at their respective outputs. In the comparator circuitry, transistor 50, diode 54 and transistor 55 are rendered conducting, and transistor 60 is driven into cutoff. The current supplied via resistor 47 is switched to transistor 50.

Under these conditions, the currents $I_V$ and $I_V'$ are zero, and transistors 92 and 102 are rendered nonconducting, permitting the potential at the base of transistor 90 to follow the voltage variations at terminal BG, and permitting the potential at the base of transistor 100 to follow the non-inverted vertical blanking waveform output developed by amplifier 43. On the other hand, the currents $I_H$ and $I_H'$ are of such a magnitude as to render transistors 82 and 72 strongly conducting, clamping the bases of transistors 80 and 70 near ground potential and precluding conduction by transistors 80 and 70.

During each vertical blanking interval, the positive-going vertical blanking pulses from amplifier 43 turn transistor 100 on and elevate the potential at terminal J to a positive level. During the active line intervals transistor 100 is cut off by the output of amplifier 43. With negative-going burst gating pulses being developed at terminal BG, transistor 90 is also cut off during those portions of the active line intervals which coincide with burst gating pulse appearances. Thus, during those portions of the active line intervals, the potential at terminal J drops to ground potential. During the remaining portions of the active line intervals (coinciding with the inter-pulse intervals of the output of gating pulse source 29), transistor 90 is driven into conduction and elevates the potential at terminal J to a positive level. The sampling control wave at terminal $C_S$, following the potential at terminal J when transistors 90 or 100 are conducting, is thus elevated at the "HOLD" level at all times, except during burst gating pulse appearances, when it drops to the "SAMPLE" level (see waveform "s", FIG. 2). The apparatus of FIG. 4 thus serves to provide a sampling control wave output appropriate to the horizontal identification mode when waveform "b" is delivered to terminal MS.

FIG. 5 illustrates circuitry which may be advantageously employed to implement the functions of the sample-and-hold circuits 22 and 24 of the system of FIG. 1. In the circuit arrangement of FIG. 5, an NPN transistor 110 is disposed as an emitter-follower coupling signals from the detector output terminal DO to the inputs of the respective sample-and-hold circuits 22 and 24. The collector-emitter path of an NPN current source transistor 111 is connected between the emitter electrode of transistor 110 and ground. The collector electrode of transistor 110 is connected to the 12 V. supply terminal.

Sample-and-hold circuit 22 includes an NPN transistor 113, disposed as an emitter-follower, with its collector electrode directly connected to the +12 V. supply terminal, with its base electrode connected via a resistor 112 to the emitter electrode of transistor 110, and with its emitter electrode connected via a resistor 118 to output terminal E1. A hold capacitor 119 is connected between terminal E1 and ground.

First and second NPN switching transistors 114, 115 are disposed with their emitter electrodes interconnected and returned to ground via the collector-emitter path of an NPN current source transistor 116. The collector electrode of switching transistor 115 is directly connected to the base electrode of a third switching transistor 117. Transistor 117 is of the PNP type and has its emitter electrode directly connected to the base electrode of transistor 113 and its collector electrode grounded. The collector electrode of switching transistor 114 is directly connected to the emitter electrode of transistor 113. Sampling control waves from terminal $C_S$ (waveforms s, s'; FIG. 2) are applied to the base electrode of switching transistor 115. Half line rate square waves from terminal FF (of flip-flop 20, FIG. 1) are applied to the base electrode of switching transistor 114.

Sample-and-hold circuit 24 includes an NPN transistor 123, disposed as an emitter-follower, with its collector electrode directly connected to the +12 V. supply terminal, with its base electrode connected via a resistor 122 to the emitter electrode of transistor 110, and with its emitter electrode connected via a resistor 128 to output terminal E2. A hold capacitor 129 is connected between terminal E2 and ground.

NPN switching transistors 124, 125 are disposed with their emitter electrodes interconnected and returned to ground via the collector-emitter path of a current source transistor 126. The collector electrode of switching transistor 125 is directly connected to the base electrode of PNP switching transistor 127. The emitter electrode of transistor 127 is directly connected to the base electrode of transistor 123, and the collector electrode of transistor 127 is grounded. The collector electrode of switching transistor 124 is directly connected to the emitter electrode of transistor 123. Sampling control waves from terminal $C_S$ are applied to the base electrode of switching transistor 125. Half line rate square waves from flip-flop terminal $\overline{FF}$ (complementary in phase to those at terminal FF) are applied to the base electrode of switching transistor 124.

In operation of the FIG. 5 arrangement, whenever appearance of the sampling control wave from terminal $C_S$ at the depressed "SAMPLE" level coincides with appearance of a positive half-cycle of the half line rate square wave at terminal FF, transistor 114 is rendered conducting and transistors 115 and 117 are rendered non-conducting, permitting transistor 113 to pass a sample of the detector output to the hold capacitor 119. At all other times, transistors 115 and 117 are conducting, and transistors 113 and 114 are cut off; under such conditions, signal passage via transistor 113 is blocked, and sample-and-hold circuit 22 operates in the hold state, retaining a potential at terminal E1 indicative of the preceding sample.

Whenever presence of the "SAMPLE" level at terminal $C_S$ coincides with appearance of a positive half-cycle of the half line rate square wave at terminal $\overline{FF}$, transistor 124 is rendered conducting, and transistors 125 and 127 are rendered non-conducting, permitting transistor 123 to pass a sample of the detector output to the hold capacitor 129. At all other times, transistors 125 and 127 are conducting and transistors 123 and 124 are cut off; under these conditions, signal passage via transistor 123 is blocked, and sample-and-hold circuit 24 operates in the hold state, retaining a potential at terminal E2 indicative of the preceding sample.

Since the half line rate square wave outputs at terminals FF and $\overline{FF}$ are complementary in phase, the sample-and-hold circuits 22 and 24 are never simultaneously in the sampling state. Instead, during operations in the horizontal identification mode, they are alternately switched to the sampling state during successive lead-in burst appearances, and during operations in the vertical identification mode, they are alternately switched to the sampling state during successive identification oscillation intervals.

In either identification mode, when the phasing of the operation of flip-flop 20 is incorrect during reception of SECAM signals, a voltage difference will be present between the potentials at output terminals E1 and E2 of a given sense and magnitude indicative of the existence of the incorrectness. The comparator 26 of the FIG. 1 arrangement, responsive to this difference voltage (appearing across capacitor 130 coupled between terminals E1, E2), provides an output of a magnitude causing level detector 28 to supply a disabling potential to flip-flop 20, which shuts down. During absence of the half line rate variations, the difference between the potentials at terminals E1 and E2 diminishes toward zero, and enabling of the flip-flop 20 is restored. If flip-flop phasing is now correct, the difference between the potentials at terminals E1 and E2 will now be of the opposite sense, and flip-flop enabling will continue undisturbed.

FIG. 6 illustrates circuitry which may be advantageously employed to implement the functions of FM detector 15, tuning control circuit 16, and gain control circuit 18 of the FIG. 1 arrangement, as well as circuitry for those portions of the control signal generating apparatus 30 which (in cooperation with circuitry of FIG. 4) develop the tuning control signals and gain control signals at terminals $C_T$ and $C_G$, respectively.

In FIG. 6, the circuitry of the FM detector 15 is of the quadrature detector type described, for example, in U.S. Pat. No. 4,232,268. The circuitry includes a signal multiplier comprising an array of seven NPN transistors (181, 182, 183, 184, 185, 186, 187). Transistors 181 and 182 are disposed in an emitter-coupled amplifier configuration, with the base of transistor 181 receiving limited signals from terminal L (the output of limiter 13, FIG. 1), with the base of transistor 182 receiving a reference bias, and with transistor 183 serving as a current source coupled to the emitters of transistors 181 and 182.

A second emitter-coupled transistor pair is formed by transistors 184 and 185, with the emitters thereof driven by the collector of transistor 181. A third emitter-coupled transistor pair is formed by transistors 186 and 187, with the emitters thereof driven by the collector of transistor 182. The bases of transistor 185 of the second emitter-coupled pair, and of transistor 187 of the third emitter-coupled pair, receive in common a reference bias. The bases of transistor 184 of the second emitter-coupled pair, and of transistor 186 of the third emitter-coupled pair, receive in common phase-shifted limited signals coupled from terminal L via emitter-follower transistor 177, capacitor 178 and emitter-follower transistor 179. Circuitry coupled between terminal P (at the junction of capacitor 178 and the base of emitter-follower transistor 179) and ground cooperate with capacitor 178 to effect a phase shifter function in a manner to be described subsequently.

Products of multiplication of the respective signal inputs appear across: (1) a load resistor 188 shared by the collector circuits of transistors 184 and 187; and (2) a load resistor 189 shared by the collector circuits of transistors 185 and 186. At a first detector output terminal DO, connected to the joined collector electrodes of transistors 184 and 187, appears a first detector output for application to the sample-and-hold circuits 22, 24 of the FIG. 1 arrangement. At a second detector output terminal DO', connected to the joined collector electrodes of transistors 185 and 186, appears a second detector output for application to the lowpass filter 17 of the FIG. 1 arrangement.

A non-inverting vertical blanking amplifier 140 has its input coupled to terminal A (FIG. 4) so as to respond to the vertical blanking waveform supplied to terminal MS by the identification mode selection signal generator 31 (FIGS. 1; 3b). The output of amplifier 140, comprising a train of positive-going vertical blanking pulses, is coupled via a resistor 141 to a terminal +V. The collector current ($I_{H'}$) from collector electrode 51 of comparator transistor 50 (FIG. 4) is supplied to the base electrode of a grounded-emitter NPN transistor 142. The base-emitter path of transistor 142 is shunted by a resistor 143, and the collector electrode of transistor 142 is directly connected to terminal +V.

A trio of NPN transistors 145, 161, 162 are disposed with their emitter electrodes interconnected and returned to ground via the collector-emitter path of an NPN transistor 163 serving as a current source. The base electrode of transistor 145 is directly connected to terminal +V, while the base electrode of transistor 161 is connected via a resistor 168 to terminal FF (of flip-flop 20, FIG. 1), and the base electrode of transistor 162 is connected via a resistor 169 to terminal HB (of horizontal blanking pulse source 21, FIG. 1). The collector electrodes of transistors 145 and 162 are directly connected to the +12 V. supply terminal, and the base electrode of source transistor 163 receives a bias current ($I_b$).

The collector electrode of transistor 161 is directly connected to the base electrode of a multiple-collector PNP transistor 164. The emitter electrode of transistor 164 is directly connected to the 12V. supply terminal, and one collector electrode (165) of transistor 164 is directly connected to the base electrode thereof. The other collector electrode (166) of transistor 164 is directly connected to the base electrode of a grounded-emitter NPN transistor 170. The base-emitter path of transistor 170 is shunted by a resistor 167, and the collector electrode of transistor 170 is directly connected to the tuning control output terminal $C_T$.

Gain control output terminal $C_G$, directly connected to terminal +V, is also directly connected to the base electrode of an NPN transistor 150. The collector electrode of transistor 150 is directly connected to the +12 V. supply terminal, while the emitter electrode of transistor 150 is returned to ground via a resistor 191. The current source transistor 183 for the signal multiplier of FM detector 15 is a multiple-emitter transistor, with one emitter electrode (193) returned to ground via the aforesaid resistor 191, with the other emitter electrode (194) returned to ground via a separate resistor 190, and with its base electrode connected to a 1.4 V. bias supply terminal.

Gain control output terminal $C_G$ is also connected via a resistor 151 to the base electrode of a grounded-emitter NPN transistor 152. The base-emitter path of transistor 152 is shunted by a resistor 153. A pair of NPN transistors 154, 155 are disposed with their emitter electrodes interconnected and returned to ground via a resistor 156. The base electrode of transistor 154 is directly connected to the collector electrode of transistor 152, and is connected via resistor 157 to a bias potential source. The collector electrode of transistor 154 is directly connected to the +12 V. supply terminal. The base electrode of transistor 155 is directly connected to the +1.4 V bias supply terminal, and the collector electrode of transistor 155 is directly connected to the joined collector electrodes of multiplier transistors 184, 187.

During operations in a horizontal identification mode (when waveform "b" is developed by generator 31, FIG. 1), the current $I_{H''}$ supplied to the base of transistor 142 renders transistor 142 conducting, clamping the base of transistor 145 to a low potential throughout active line intervals as well as the vertical blanking intervals. The potential at gain control terminal $C_G$ (see waveform "g", FIG. 2) is held low at the GAIN NORMAL level, and transistors 150 and 152 are cut off. With transistor 150 cut off, the current supplied to multiplier transistors 181, 182 by source transistor includes the current traversing emitter resistor 191 as well as the current traversing emitter resistor 190. With transistor 152 cut off, the potential at the base of transistor 154 is elevated sufficiently to effect cutoff of transistor 155. Thus, in the horizontal identification mode, the output devices (150, 155) of the gain control circuit 18 are nonconducting during all signal intervals and introduce no disturbance of normal operations of the FM detector.

Also, during operations in a horizontal identification mode, transistor 161 is cut off during each line interval which coincides with development of the negative half-cycle of the half line rate square wave at terminal FF. During the intervening line intervals which coincide with development of a positive half cycle of the half line rate square wave at terminal FF, transistor 161 is permitted to conduct, except during that (horizontal blanking) portion thereof which coincides with appearance of a positive-going horizontal blanking pulse at the base of transistor 162. A replicated version of the collector current of transistor 161, developed by transistor 164 functioning as a current mirror, is supplied as base current to transistor 170. Thus, throughout alternate line intervals and during the horizontal blanking portion of the intervening line intervals, transistor 170 is cut off, and, during the remaining portion of each of said intervening line intervals, transistor 170 is switched on. During such conduction periods for transistor 170, the potential at terminal $C_T$ drops to the B-Y TUNING level (waveform "t", FIG. 2); in the absence of conduction by transistor 170, the potential remains at the R-Y TUNING level.

When transistor 170 conducts, the parallel combination of variable capacitor 171 and resistor 172 is shunted across the parallel combination of capacitor 173, resistor 175, and inductor 174. The latter parallel combination is coupled in series with capacitor 176 between ground and phase shifter terminal P. Capacitor 173 and inductor 174 are tuned to exhibit parallel resonance at the R-Y subcarrier resting frequency. Capacitor 171 is adjusted to a value which causes the parallel combination of elements 171, 173, and 174 to exhibit parallel resonance at the B-Y subcarrier resting frequency. Thus, during periods when conduction by transistor 170 places capacitor 171 in shunt with tank circuit formed by elements 173, 174, signals supplied to the bases of transistors 184 and 186 are subject to the action of a phase shifter which imparts a 90° phase shift for a signal frequency substantially equal to the B-Y subcarrier resting frequency. At all other times, when capacitor 171 is decoupled from the tank circuit, the supplied signals are subject to the action of a phase shifter which imparts a 90° phase shift for a signal frequency substantially equal to the R-Y subcarrier resting frequency.

During operations in a vertical identification mode, the current $I_{H''}$ from collector 51 is zero and transistor 142 is cut off. Under these circumstances, the potential at terminal $C_G$ is allowed to follow the voltage variations of the output of amplifier 140. These voltage variations are such that the gain control wave at terminal $C_G$ swings up to the GAIN REDUCED level during each vertical blanking interval, but remains down at the GAIN NORMAL level throughout the active line intervals (see waveform g', FIG. 2). During the active line intervals, the operation of the gain control circuit 18 is the same as described above for operations during the horizontal identification mode.

However, during each vertical blanking interval, when the potential at termrinal $C_G$ swings positive, transistors 150 and 152 are rendered conducting. With transistor 150 conducting, current is stolen from emitter 193, and the current supplied by source transistor 183 to the signal multiplier is reduced to lower the FM detector gain. Conduction by transistor 152 drives transistor 154 off, turning transistor 155 on. With suitable proportioning of circuit parameters, the current drawn by transistor 155 through load resistor 188 is sufficient to preclude any significant shift in the DC component at terminal DO from accompanying the depression in current supplied by source transistor 183.

Also, during operations in the vertical identification mode, the potential at the base of transistor 145 is permitted to follow the voltage variations of the output of the non-inverting amplifier 140. These voltage variations are such that transistor 161 is cut off throughout each vertical blanking interval, while during active line intervals, control of the conduction of transistor 161 is the same as described above for horizontal identification mode operations. The effect of such control of the collector current of transistor 161 on the tuning control wave developed at terminal $C_T$ is as shown by waveform t' of FIG. 2, with the output at the R-Y TUNING level throughout each vertical blanking interval. As a consequence, capacitor 171 is decoupled from the tank circuit formed by capacitor 173 and inductor 174 throughout each vertical blanking interval, leaving the FM detector 15 with center frequency tuning at the R-Y subcarrier resting frequency during all identification line intervals.

Illustratively, the circuitry of the present invention may be employed as a portion of a SECAM-PAL transcoder of the general type described in the aforementioned U.K. Pat. No. 1,358,551, and desirably incorporating modulation techniques of the type described in U.S. Pat. No. 4,233,622. In such a mode of employment, where ultimate processing of color-difference signal information is effected by conventional PAL decoder circuitry, the value of resistor 172 in shunt with the B-Y tuning establishment capacitor 171 (FIG. 6) is desirably chosen to alter the damping of the tank circuit during B-Y demodulation intervals so as to adjust the R-Y/B-Y amplitude ratio of the signals recovered from the SECAM subcarriers to that ratio expected by the subsequently employed PAL decoder circuitry.

Reference may be advantageously made to the co-pending U.S. Patent application of M. B. Knight, Ser. No. 257,104, concurrently filed herewith and entitled "Dual-Mode Control Signal Generating Apparatus", for a description of an alternative approach to the generation of the control signals that appear at terminals −V and +H of FIG. 4 hereof, and at terminal +V of FIG. 6 hereof. For integrated circuit realization of the selection sensitive control signal generating apparatus, the approach described in the Knight application possesses advantages of economy of parts and power consumption.

What is claimed is:

1. In a color television receiver subject to reception of composite color television signals having periodic vertical blanking intervals interposed between successive sequences of active line intervals, and inclusive of a chrominance component encoded in SECAM format; said SECAM-encoded chrominance component comprising, during image portions of alternate active line intervals, a first subcarrier having a first resting frequency and subject to frequency modulation over a given frequency deviation range in accordance with a first color-difference signal, and during image portions of the intervening active line intervals, a second subcarrier having a second resting frequency and subject to frequency modulation over said given frequency deviation range in accordance with a second color-difference signal, with a lead-in burst of oscillations at said first resting frequency preceding the image portion of each of said alternate active line intervals, and with a lead-in burst of oscillations at said second resting frequency preceding the image portion of each of said intervening active line intervals; said SECAM-encoded chrominance component additionally comprising: (a) during corresponding portions of alternate ones of a sequence of identification line intervals within each of said vertical blanking intervals, identification oscillations initially occurring at said first resting frequency, subsequently deviating therefrom in the direction of the limit of said deviation range which is most remote from said second resting frequency and terminally occurring at the frequency of said remote range limit; and (b) during corresponding portions of the intervening ones of said sequence of identification line intervals, identification oscillations initially occurring at the second resting frequency, subsequently deviating therefrom in the direction of the opposite limit of said deviation range, and terminally occurring at the frequency of said opposite range limit; apparatus comprising:

an FM detector, responsive to the received signals, and subject to operation in either a first mode with center frequency tuning corresponding to the resting frequency of said first subcarrier, or a second mode with center frequency tuning corresponding to the resting frequency of said second subcarrier;

a triggered flip-flop circuit for providing, when enabled, a half line rate wave output;

means, responsive to a half line rate wave output of said flip-flop circuit, for controlling the operating mode of said FM detector;

identification means for (a) effecting recognition of an occurrence of incorrect control of said detector operating mode in response to the output of said FM detector during said lead-in burst appearances, when operating in a first identification mode, and (b) effecting recognition of an occurrence of incorrect control of said detector operating mode in response to the output of said FM detector during said identification oscillation appearances, when operating in a second identification mode;

means, responsive to an output of said identification means, for altering the operation of said flip-flop circuit upon recognition of an occurrence of incorrect control of said detector operating mode by said identification means;

an identification mode selection signal generator; and means, responsive to an output of said identification mode selection signal generator, for controlling the mode of operation of said identification means.

2. Apparatus in accordance with claim 1 wherein said FM detector, said flip-flop circuit, said detector operating mode controlling means, said identification means, said flip-flop circuit operation altering means, and said identification means operating mode controlling means are at least partially realized in integrated circuit form on a common substrate, whereas said identification mode selection signal generator is formed by components independent of said common substrate.

3. Apparatus in accordance with claim 1 or claim 2 wherein said identification mode selection signal generator comprises a source of a vertical blanking waveform having an output terminal, said vertical blanking waveform appearing at said output terminal as voltage variations bearing a selected one of the following relationships to given voltage reference level: (a) a first relationship thereto such that all voltage excursions of said waveform at said output terminal remain above said given voltage reference level; and (b) a second relationship thereto such that all voltage excursions of said waveform remain below said given voltage reference level.

4. Apparatus in accordance with claim 3 also including a source of line rate pulses timed to encompass the periods of appearance of said lead-in bursts to the exclusion of the periods of appearance of said modulated subcarriers;
wherein said detector operating mode controlling means is additionally responsive to said line rate pulses, and to the relationship of said voltage variations to said reference level, so as to control the operating mode of said FM detector such that said FM detector operates in respectively different ones of said modes during the image portions of successive active line intervals, but (1) in the presence of a given one of said first and second relationships, said FM detector operates in only said first mode during the periods of appearance of said lead-in bursts; and (2) in the presence of the other of said first and second relationships, said FM detector operates in only said first mode during said corresponding portions of successive ones of said identification line intervals;
wherein said identification means comprises:
(1) first sampling means, coupled to receive an output of said FM detector, and responsive to said line rate pulses, to a half line rate wave output of said flip-flop circuit, and to the relationship of said voltage variations to said reference level, for (a) sampling the output of said FM detector only during alternate ones of said periods of appearance of lead-in bursts, in the presence of said given one of said relationships, and (b) sampling the output of said FM detector during alternate ones of the periods of appearance of said identification oscillations, in the presence of the other of said relationships;
(2) second sampling means, coupled to receive an output of said FM detector, and responsive to said line rate pulses, to a half line rate wave output complementary in phase to the half line rate wave to which said first sampling means is responsive, and to the relationship of said voltage variations to said reference level, for (a) sampling the output of said FM detector only during the intervening ones of said periods of appearance of said lead-in bursts, in the presence of said given one of said relationships, and (b) sampling the output of said FM detector during the remaining ones of the periods of appearance of said identification oscillations, in the presence of the other of said relationships;
(3) means for comparing the output levels of said first and second sampling means; and
(4) means, responsive to an output of said comparing means, for indicating recognition of an occurrence of incorrect control of said detector mode only when the output level of a given one of said sampling means significantly exceeds the output level of the other of said sampling means.

5. Apparatus in accordance with claim 4 also including:
means, responsive to the waveform at said output terminal, for reducing the gain of said FM detector, during said periodic vertical blanking intervals, in the presence of the other of said first and second relationships, relative to the gain of said FM detector maintained in the presence of said one of said first and second relationships.

6. Apparatus in accordance with claim 4 also including means for developing a unidirectional supply potential between first and second supply terminals, and wherein said identification means operation mode controlling means includes:
a voltage divider having input terminals coupled respectively to said first and second supply terminals, and having an output terminal at which is developed a potential equal to said voltage reference level;
first and second transistors, each having base, emitter and collector electrodes;
a common current path coupled between said emitter electrodes and one of said supply terminals;
a second current path coupled between the collector electrode of said first transistor and the other of said supply terminals;
a third current path coupled between the collector electrode of said second transistor and said other of said supply terminals;
means for rendering the potential at the base electrode of said first transistor responsive to the potential at said waveform source output terminal;
means for rendering the potential at the base electrode of said second transistor responsive to the potential at said divider output terminal; and
means, responsive to the respective current levels in said second and third current paths, for controlling the operation of said sampling means.

7. Apparatus in accordance with claim 6 also including a source of horizontal blanking pulses, and wherein said sampling means operation controlling means is additionally responsive to said horizontal blanking pulses, said line rate pulses and said vertical blanking waveform.

8. In a color television receiver subject to reception of composite color television signals having periodic vertical blanking intervals interposed between successive sequences of active line intervals, and inclusive of a chrominance component encoded in SECAM format; said SECAM-encoded chrominance component comprising, during image portions of alternate active line intervals, a first subcarrier having a first resting frequency and subject to frequency modulation over a given frequency deviation range in accordance with a first color-difference signal, and during image portions of the intervening active line intervals, a second subcarrier having a second resting frequency and subject to frequency modulation over said given frequency deviation range in accordance with a second color-difference signal, with a lead-in burst of oscillations at said first resting frequency preceding the image portion of each of said alternate active line intervals, and with a lead-in burst of oscillations at said second resting frequency preceding the image portion of each of said intervening active line intervals;
apparatus comprising:
an FM detector, responsive to the received signals, and subject to operation in either a first mode with center frequency tuning corresponding to the resting frequency of said first subcarrier, or a second mode with center frequency tuning corresponding to the resting frequency of said second subcarrier;

a triggered flip-flop circuit for providing, when enabled, a pair of half line rate wave outputs of mutually opposite phase;

a source of line rate pulses timed to encompass the periods of appearance of said lead-in bursts to the exclusion of the periods of appearance of said modulated subcarriers;

a source of horizontal blanking pulses;

a source of a vertical blanking waveform having an output terminal, said vertical blanking waveform appearing at said output terminal as voltage variations bearing a selected one of the following relationships to a given voltage reference level: (a) a first relationship thereto such that all voltage excursions of said waveform at said output terminal remain above said given voltage reference level; and (b) a second relationship thereto such that all voltage excursions of said waveform remain below said given voltage reference level;

means, responsive to said horizontal blanking pulses, to a half line rate wave output and to the relationship of said voltage variations to said reference level, for controlling the operating mode of said FM detector such that in the presence of a given one of said first and second relationships, said FM detector operates in respectively different ones of said modes during the image portions of successive active line intervals but operates in only said first mode during the periods of appearance of said lead-in bursts;

first sampling means, coupled to receive an output of said FM detector, and responsive to said line rate pulses, to one of said pair of half line rate wave outputs, to said voltage variations, and to the relationship of said voltage variations to said reference level, for sampling the output of said FM detector only during alternate ones of said periods of appearance of lead-in bursts, in the presence of said given one of said relationships;

second sampling means, coupled to receive an output of said FM detector, and responsive to said line rate pulses, to the other of said pair of half line rate wave outputs, to said voltage variations, and to the relationship of said voltage variations to said reference level, for sampling the output of said FM detector only during the intervening ones of said periods of appearance of said lead-in bursts, in the presence of said given one of said relationships;

means for comparing the output levels of said first and second sampling means; and means, responsive to an output of said comparing means, for altering the operation of said flip-flop circuit only when the output level of a given one of said sampling means significantly exceeds the output level of the other of said sampling means.

9. Apparatus in accordance with claim 8:

wherein said SECAM-encoded chrominance component additionally comprises: (a) during corresponding portions of alternate ones of a sequence of identification line intervals within each of said vertical blanking intervals, identification oscillations initially occurring at said first resting frequency, subsequently deviating therefrom in the direction of the limit of said deviation range which is most remote from said second resting frequency and terminally occurring at the frequency of said remote range limit; and (b) during corresponding portions of the intervening ones of said sequence of identification line intervals, identification oscillations initially occurring at the second resting frequency, subsequently deviating therefrom in the direction of the opposite limit of said deviation range, and terminally occurring at the frequency of said opposite range limit;

wherein, in the presence of the other of said first and second relationships, said FM detector operates in only said first mode during said corresponding portions of successive ones of said identification line intervals;

wherein said first sampling means samples the output of said FM detector during alternate ones of the periods of appearance of said identification oscillations, to the exclusion of (1) said active line intervals; (2) portions of said identification line intervals unoccupied by identification oscillations, and (3) other periods of appearance of said identification oscillations, in the presence of the other of said relationships; and wherein said second sampling means samples the output of said FM detector during said other periods of appearance of said identification oscillations, to the exclusion of (1) said active line intervals, (2) portions of said identification line intervals unoccupied by identification oscillations, and (3) said alternate ones of the periods of appearance of said identification oscillations, in the presence of the other of said relationships.

10. Apparatus in accordance with claim 9 also including:

means, responsive to the waveform at said output terminal, for reducing the gain of said FM detector, during said periodic vertical blanking intervals, in the presence of the other of said first and second relationships, relative to the gain of said FM detector maintained in the presence of said one of said first and second relationships.

11. In a color television receiver subject to reception of composite color television signals having periodic vertical blanking intervals interposed between successive sequences of active line intervals, and inclusive of a chrominance component encoded in SECAM format; said SECAM-encoded chrominance component comprising, during image portions of alternate active line intervals, a first subcarrier having a first resting frequency and subject to frequency modulation over a given frequency deviation range in accordance with a first color-difference signal, and during image portions of the intervening active line intervals, a second subcarrier having a second resting frequency and subject to frequency modulation over said given frequency deviation range in accordance with a second color-difference signal, with a lead-in burst of oscillations at said first resting frequency preceding the image portion of each of said alternate active line intervals, and with a lead-in burst of oscillations at said second resting frequency preceding the image portion of each of said intervening active line intervals; said SECAM-encoded chrominance component additionally comprising: (a) during corresponding portions of alternate ones of a sequence of identification line intervals within each of said vertical blanking intervals, identification oscillations initially occurring at said first resting frequency, subsequently deviating therefrom in the direction of the limit of said deviation range which is most remote from said second resting frequency and terminally occurring at the frequency of said remote range limit; and (b) during corresponding portions of the intervening ones of said sequence of identification line intervals, identification oscillations initially occurring at the second resting frequency, subsequently deviating therefrom in the direction of the opposite limit of said deviation range, and terminally occurring at the frequency of said opposite range limit; apparatus comprising:

an FM detector, responsive to the received signals, and subject to operation in either a first mode with center frequency tuning corresponding to the resting frequency of said first subcarrier, or a second mode with center frequency tuning corresponding to the resting frequency of said second subcarrier;

a triggered flip-flop circuit for providing, when enabled, a pair of half line rate wave outputs of mutually opposite phase;

a source of line rate pulses timed to encompass the periods of appearance of said lead-in bursts to the exclusion of the periods of appearance of said modulated subcarriers;

a source of a vertical blanking waveform having an output terminal, said vertical blanking waveform appearing at said output terminal as voltage variations bearing a selected one of the following relationships to a given voltage reference level: (a) a first relationship thereto such that all voltage excursions of said waveform at said output terminal remain above said given voltage reference level; and (b) a second relationship thereto such that all voltage excursions of said waveform remain below said given voltage reference level;

means, responsive to said line rate pulses, to a half line rate wave output and to the relationship of said voltage variations to said reference level, for controlling the operating mode of said FM detector such that said FM detector operates in respectively different ones of said modes during the image portions of successive active line intervals, but (1) in the presence of a given one of said first and second relationships, said FM detector operates in only said first mode during the periods of appearance of said lead-in bursts; and (2) in the presence of the other of said first and second relationships, said FM detector operates in only said first mode during said corresponding portions of successive ones of said identification line intervals;

first sampling means, coupled to receive an output of said FM detector, and responsive to said line rate pulses, to one of said pair of half line rate wave outputs, and to the relationship of said voltage variations to said reference level, for (1) sampling the output of said FM detector only during alternate ones of said periods of appearance of lead-in bursts, in the presence of said given one of said relationships, and (2) sampling the output of said FM detector during alternate ones of the periods of appearance of said identification oscillations, to the exclusion of (a) said active line intervals, (b) portions of said identification line intervals unoccupied by identification oscillations, and (c) other periods of appearance of said identification oscillations, in the presence of the other of said relationships;

second sampling means, coupled to receive an output of said FM detector, and responsive to said line rate pulses, to the other of said pair of half line rate wave outputs, and to the relationship of said voltage variations to said reference level, for (1) sampling the output of said FM detector only during the intervening ones of said periods of appearance of said lead-in bursts, in the presence of said given one of said relationships, and (2) sampling the output of said FM detector during said other periods of appearance of said identification oscillations, to the exclusion of (a) said active line intervals, (b) portions of said identification line intervals unoccupied by identification oscillations, and (c) said alternate ones of the periods of appearance of said identification oscillations, in the presence of the other of said relationships;

means for comparing the output levels of said first and second sampling means;

means, responsive to an output of said comparing means, for altering the operation of said flip-flop circuit only when the output level of a given one of said sampling means significantly exceeds the output level of the other of said sampling means;

means, responsive to the waveform at said output terminal, for altering the gain of said FM detector, during said periodic vertical blanking intervals, in the presence of the other of said first and second relationships, to a level reduced relative to the level of gain of said FM detector that is maintained in the presence of said one of said first and second relationships; and means, also responsive to the waveform at said output terminal, for selectively adding a DC component to the output of said FM detector during periods when the gain of said FM detector is at said reduced level.

12. In a color television receiver subject to reception of composite color television signals having periodic vertical blanking intervals interposed between successive sequences of active line intervals, and inclusive of a chrominance component encoded in SECAM format; said SECAM-encoded chrominance component comprising, during image portions of alternate active line intervals, a first subcarrier having a first resting frequency and subject to frequency modulation over a given frequency deviation range in accordance with a first color-difference signal, and during image portions of the intervening active line intervals, a second subcarrier having a second resting frequency and subject to frequency modulation over said given frequency deviation range in accordance with a second color-difference signal; said SECAM-encoded chrominance component additionally comprising: (a) during corresponding portions of alternate ones of a sequence of identification line intervals within each of said vertical blanking intervals, identification oscillations initially occurring at said first resting frequency, subsequently deviating therefrom in the direction of the limit of said deviation range which is most remote from said second resting frequency and terminally occurring at the frequency of said remote range limit; and (b) during corresponding portions of the intervening ones of said sequence of identification line intervals, identification oscillations initially occurring at the second resting frequency, subsequently deviating therefrom in the direction of the opposite limit of said deviation range, and terminally occurring at the frequency of said opposite range limit; apparatus comprising:

an FM detector, responsive to the received signals, and subject to operation in either a first mode with center frequency tuning corresponding to the resting frequency of said first subcarrier, or a second mode with center frequency tuning corresponding to the resting frequency of said second subcarrier;

a triggered flip-flop circuit for providing, when enabled, a pair of half line rate wave outputs of mutually opposite phase;

a source of line rate pulses;

a source of a vertical blanking waveform having an output terminal;

means, responsive to the voltage waveform at said output terminal, and to a half line rate wave output of said flip-flop circuit, for controlling the operating mode of said FM detector such that said FM detector operates in respectively different ones of said modes during the image portions of successive active line intervals but operates in only said first mode during said corresponding portions of successive ones of said identification line intervals;

first sampling means, coupled to receive an output of said FM detector, and responsive to said line rate pulses, to one of said pair of half line rate wave outputs, and to the voltage waveform at said output terminal, for sampling the output of said FM detector during alternate ones of the periods of appearance of said identification oscillations, to the exclusion of (1) said active line intervals, (2) portions of said identification line intervals unoccupied by identification oscillations, and (3) other periods of appearance of said identification oscillations;

second sampling means, coupled to receive an output of said FM detector, and responsive to said line rate pulses, to the other of said pair of half line rate wave outputs, and to the voltage waveform at said output terminal, for sampling the output of said FM detector during said other periods of appearance of said identification oscillations, to the exclusion of (1) said active line intervals, (2) portions of said identification line intervals unoccupied by identification oscillations, and (3) said alternate ones of the periods of appearance of said identification oscillations;

means for comparing the output levels of said first and second sampling means;

means, responsive to an output of said comparing means, for altering the operation of said flip-flop circuit only in the presence of a significant difference in the output levels of the respective sampling means of a given sense.

* * * * *